United States Patent [19]
Mahoney

[11] Patent Number: 5,392,130
[45] Date of Patent: Feb. 21, 1995

[54] ANALYZING AN IMAGE SHOWING A ROW/COLUMN REPRESENTATION

[75] Inventor: James V. Mahoney, San Francisco, Calif.

[73] Assignee: Xerox Corporation, Stamford, Conn.

[21] Appl. No.: 157,782

[22] Filed: Nov. 24, 1993

[51] Int. Cl.$^6$ .............................................. H04M 1/00
[52] U.S. Cl. ..................................... 358/400; 358/453
[58] Field of Search .......................... 358/400, 401–402, 358/453, 462, 464; 382/61, 10

[56] References Cited

U.S. PATENT DOCUMENTS

| | | | |
|---|---|---|---|
| 4,542,378 | 9/1985 | Suganuma et al. | 340/734 |
| 4,884,146 | 11/1989 | Yatsunami | 358/400 |
| 4,924,078 | 5/1990 | Sant'Anselmo | 235/494 |
| 4,972,475 | 11/1990 | Sant'Anselmo | 380/54 |
| 5,228,100 | 7/1993 | Takeda et al. | 382/61 |

OTHER PUBLICATIONS

Wayner, P., "Optimal Character Recognition", BYTE, Dec. 1993, pp. 203, 204, 206, 208, and 210.
Ricoh Imagio MF530 Series General Catalog, Ricoh K.K., 1992, with English translation of cover page and pp. 1–2 and 23–24.
Adams, R., "Bar codes go two dimensional; the portable data base arrives", Automatic I.D. News, vol. 6, No. 5, May 1990, pp. 1, 60, 62, 64 and 77.
The Apple Catalog, Fall 1993, pp. 2 and 4–5.

Primary Examiner—Stephen Brinich

[57] ABSTRACT

Input image data define an input image that shows a row/column representation, such as a table; a matrix; an array; a calendar; a two-dimensional connection diagram such as a programmable logic array (PLA) diagram; a puzzle or game diagram such as a crossword puzzle, a chess or checkers diagram, a go game diagram, or ticktacktoe. The input image data are used to obtain row data and column data. The row data indicate parts of the input image within a row of the row/column representation. The column data indicate parts of the input image within a column of the row/column representation. The row data and column data are used to obtain content data indicating information represented by the row/column representation for the combination of the row and the column. The content data can be used to obtain output image data defining an output image that includes a table or other representation of the information represented by the row/column representation for each row/column combination. The input image can show a sketch of a row/column representation and the content data can be used to obtain output image data defining an output image that includes a precisely formed row/column representation similar to the sketch.

20 Claims, 11 Drawing Sheets

ANALYZING AN IMAGE SHOWING A ROW/COLUMN REPRESENTATION

BACKGROUND OF THE INVENTION

The present invention relates to techniques for analyzing an image showing a graphical representation.

Takeda et al., U.S. Pat. No. 5,228,100, describe techniques for producing a form display from a document image. The form display has blank fields and a program to input data to the blank fields. As shown and described in relation to FIG. 1, a document processing apparatus includes a processor, an image input device for storing image data in memory, a printer for achieving a print operation of data from memory, and memory for programs and for data items. As shown and described in relation to FIG. 2, a document format recognition step recognizes an image of a document format to determine a format information item, a document construction step generates document content data associated with the document format, the system creates output data for the document data based on the resultant format and content data, and a document output step prints the output document data on a print form or stores it in a data file. FIG. 3 shows an example of a document form supplied from an image input device and FIG. 4 shows a document example produced by a printer.

Takeda et al. show and describe in relation to FIGS. 8, 9-a, and 9-b, in a physical structure recognition step, how an area is subdivided into a plurality of blocks, and the system judges whether or not a selected block has a type representing a table. The judgement may be accomplished such that, for example, when the block has a horizontal width and a vertical height respectively exceeding predetermined threshold values, the block is determined to belong to a table. The block is subdivided into subblocks or subregions and a subblock is selected and recognized. The system selects one of the subblocks and recognizes whether or not it has a type of an area constituting a cell. If so, a recursive call is made to further recognize the physical structure of the area.

Takeda et al. show and describe in relation to FIGS. 10–13 how an area is subdivided. FIGS. 14-a through 14-c show examples, with FIG. 14-a showing an area recognized after a first block division step on the original image in FIG. 3; FIG. 14-b showing the configuration of an area recognized when an area division step is achieved on blocks judged to be associated with a table in FIG. 14-a; and FIG. 14-c showing an area recognized when block division is accomplished for areas judged to be cells in FIG. 14-b. Area type recognition is shown and described in relation to FIGS. 15–19. Construction element recognition, including character recognition, is shown and described in relation to FIGS. 24–33.

Takeda et al. show and describe in relation to FIGS. 41 through 66-b how a document's logical structure is recognized. As shown and described in relation to FIGS. 42 through 45-b, positions and sizes of characters, ruled lines, etc. written in a document are normalized to align the items with respect to a row and column. FIGS. 46 through 50-b and FIGS. 51-b through 66 show alternative logical structure recognition techniques.

SUMMARY OF THE INVENTION

The invention is based on the discovery of a technique for analyzing an image showing a row/column representation such as a table; a matrix; an array; a calendar; a two-dimensional connection diagram such as a programmable logic array (PLA) diagram; a puzzle or game diagram such as a crossword puzzle, a chess or checkers diagram, a go game diagram, or ticktacktoe; or another graphical representation that includes rows and columns and represents information for row/column combinations. The technique analyzes the image to obtain information for row/column combinations in the representation.

The technique is based on the recognition that a row/column representation includes features that extend across the representation in orthogonal directions, with information for each row/column combination represented in a part of the representation where two such features intersect, one feature being a row and the other being a column. The technique therefore analyzes an image by first obtaining the line or band for a row and the line or band for a column; the lines or bands can then be used to obtain the information represented for the row/column combination.

The technique obtains input image data defining an input image showing a row/column representation. The technique uses the input image data to obtain row data and column data. The row data indicate parts of the input image within a row of the row/column representation. The column data indicate parts of the input image within a column. The technique uses the row data and the column data to obtain content data indicating information represented for the row/column combination.

The technique can, for example, obtain the row data and column data by first obtaining horizontal data and vertical data indicating, respectively, horizontal and vertical lines in the input image. Then, the technique can use the horizontal data to obtain row data indicating parts of the input image between horizontal lines and can also use the vertical data to obtain column data indicating parts of the input image between vertical lines. The row data and the column data together indicate rows and columns.

The row data and column data can therefore include two versions of the input image, one a row data image indicating pixels in parts of the input image that are between horizontal lines, the other a column data image indicating pixels between vertical lines. Within the row data image, each pixel in a row could be labeled with an integer uniquely identifying its row, and, within the column data image, each pixel in a column could be labeled with an integer uniquely identifying its column.

Content data can be obtained for each row/column combination. The content data can include a list of sublists, with each sublist including a list of combination identifiers identifying combinations of columns with one of the row. Each sublist can include, for each combination, bounding box data indicating a bounding box within which information for the identified combination of a column with a row is represented.

The technique can store the content data or use it somehow. For example, the technique can use the content data to provide control signals to a system. Or the input image can show a sketch of a row/column representation and the technique can use the content data to obtain data defining an image showing a precisely formed row/column representation similar to the sketch, such as a table.

The technique can be implemented with a machine that includes image input circuitry and data indicating image processing instructions. The image input circuitry can receive data defining an image set that shows a row/column representation. The machine's processor can execute the image processing instructions. In executing the image processing instructions, the processor can receive the input image data from the image input circuitry and use the input image data to obtain row data and column data as described above. The processor can then use the row data and column data to obtain content data indicating information represented by the row/column representation for a combination of a row and a column. The machine can be a high-speed image processing server that responds to image processing requests from a network to which it is connected.

The machine can also include image output circuitry, and the processor can use the content data to obtain output image data defining an output image that shows a row/column representation similar to the analyzed row/column representation. The machine can be a fax server or a copier.

The technique can also be implemented in a software product that includes a storage medium and data stored by the storage medium. The software product can be used in a machine that includes image input circuitry. The data stored by the storage medium can include image processing instructions the machine's processor can execute. In executing the image processing instructions, the processor can receive input image data from the image input circuitry defining an input image that shows a row/column representation and use the input image data to obtain row data and column data as described above. The processor can then use the row/column data to obtain content data indicating information represented by the row/column representation for a combination of a row and a column.

The technique described above is advantageous because it makes it possible to automatically analyze a variety of row/column representations. The content data obtained by the technique can be used to produce an image showing a precisely formed row/column representation in response to a simple sketch by a user.

The following description, the drawings, and the claims further set forth these and other aspects, objects, features, and advantages of the invention.

DETAILED DESCRIPTION

A. Conceptual Framework

Figure 1:
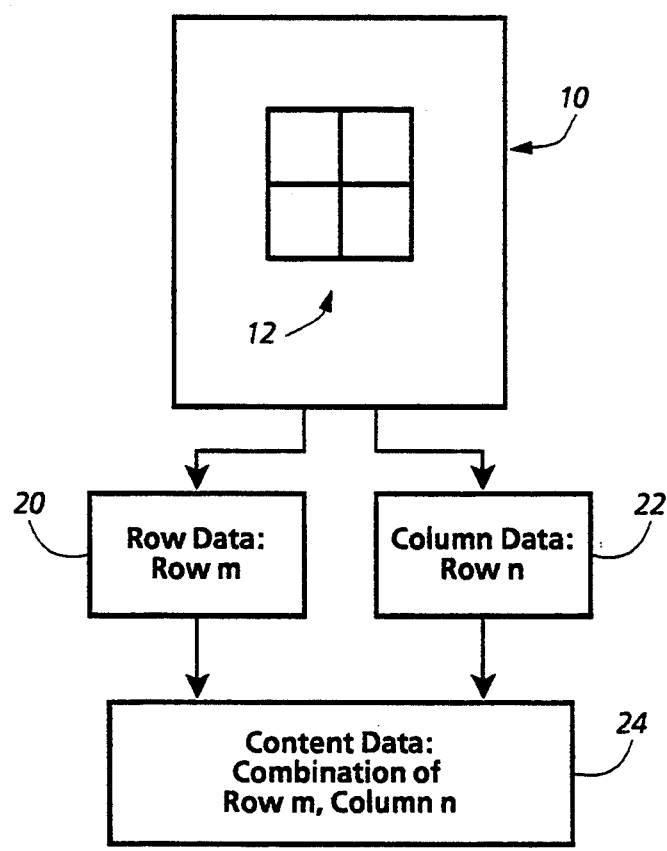
FIG. 1 is a schematic diagram illustrating how an image showing a row/column representation can be analyzed.

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low."

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "data processing system" is a physical system that processes data. A "data processor" or "processor" is any component or system that can process data, and may include one or more central processing units or other processing components. A processor performs an operation or a function "automatically" when it performs the operation or function independent of concurrent human control.

Any two components are "connected" when there is a combination of circuitry that can transfer signals from one of the components to the other.

A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor or other component of circuitry "uses" an item of data in performing an operation when the result of the operation depends on the value of the item. For example, the operation could perform a logic or arithmetic operation on the item or could use the item to access another item of data.

An "instruction" is an item of data that a processor can use to determine its own operation. A processor "executes" a set of instructions when it uses the instructions to determine its operations.

A "control signal" is a signal provided to a machine or other system that can cause a change in the system's state, such as by changing the way in which the system operates. In executing a set of instructions, a processor may, for example, provide control signals to internal components within the processor and to external components connected to the processor, such as input/output devices.

A signal "requests" or "is a request for" an event or state when the signal can cause occurrence of the event or state.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

An item of data "identifies" or "is an identifier of" one of a set of identifiable items if the item of data is one of a set of items of data, each of which can be mapped to at most one of the identifiable items.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An item of data "indicates" a thing, an event, or a characteristic when the item has a value that depends on the existence or occurrence of the thing, event, or characteristic or on a measure of the thing, event, or characteristic.

An item of data "includes" information indicating a thing, an event, or a characteristic if data indicating the thing, event, or characteristic can be obtained by operating on the item of data. Conversely, an item of information that indicates a thing, an event, or a characteristic can be said to "include" an item of data if data indicating the thing, event, or characteristic can be obtained by operating on the item of data.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

An "image" is a pattern of physical light. An "image set" is a set of one or more images.

When an image is a pattern of physical light in the visible portion of the electromagnetic spectrum, the image can produce human perceptions. The term "graphical feature", or "feature", refers to any human perception produced by, or that could be produced by, an image.

An image "shows" a feature when the image produces, or could produce, a perception of the feature. An image set "shows" a feature when the image set includes one or more images that, separately or in combination, show the feature. An item of data "defines" a feature when the item defines an image set that shows the feature.

A "graphical representation" is a graphical feature that includes elements that are spatially related in a configuration that represents information.

An image may be divided into "segments," each of which is itself an image. A segment of an image may be of any size up to and including the whole image.

An image or image set may be analyzed into "parts," each of which is smaller than the whole image or image set. Each part includes one or more segments of the image or segments of images in the image set.

An item of data "defines" an image when the item of data includes sufficient information to produce the image. For example, a two-dimensional array can define all or any part of an image, with each item of data in the array providing a value indicating the color of a respective location of the image.

A "data image" is an item of data defining an image.

An item of data "defines" an image set when the item of data includes sufficient information to produce all the images in the set.

An image or image set "includes" information indicating a thing, an event, or a characteristic if an item of data indicating the thing, event, or characteristic can be obtained by operating on an item of data defining the image or image set.

A "data transmission" is an act that physically transmits data from one location to another. A "facsimile transmission" is a data transmission in which the transmitted data define an image set according to a standard format. An "image destination" is a machine or other destination to which data defining an image can be transmitted. A "fax machine" is a machine with circuitry that can receive and provide facsimile transmissions. Therefore, the telephone number of a fax machine is an example of information that indicates an image destination.

A "marking medium" is a physical medium on which a human can produce a pattern of marks by performing marking actions or by performing actions that modify marks, such as erasing, wiping, or scratching actions. Common examples of marking media include sheets of paper and plastic, although humans can produce patterns of marks on an enormous variety of media. As used herein, "marking medium" covers one or more distinct units of a medium on which, together, a human has produced a pattern of related marks. For example, a set of paper pages that form a handwritten letter would be a single marking medium. Also, as used herein, "marking medium" includes a marking surface of an electronic device that can sense marks, such as a tablet, a touch- or signal-sensitive display, or another pen- or stylus-based input device.

A human "marks" a marking medium or "makes a mark on" a marking medium by performing any action that produces or modifies marks on the marking medium; a human may mark a marking medium, for example, with marking, stamping, erasing, wiping, or scratching actions.

A human makes a mark "by hand" when the human holds an instrument in a hand and moves the instrument across or against the surface of a marking medium to make the mark. The instrument could, for example, be a pen, a pencil, a stylus, a dry marker, a crayon, a brush, a stamp, an eraser, and so forth.

Marks are made "by a machine under control of a human" when the human performs actions that cause the machine to make the marks. The machine could, for example, be a typewriter, a printer, a copier, a fax machine, and so forth.

A "human-produced image" is an image that shows marks made by hand by a human, by a machine under control of a human, or in some other way in which a human can provide marks.

The term "mark" includes a single mark and also plural marks that together form a pattern of marks.

A mark "indicates" a thing, an event, or a characteristic when the presence or shape of the mark depends on the existence or occurrence of the thing, event, or characteristic or on a measure of the thing, event, or characteristic. For example, a mark can indicate a boundary.

A "version" of a first image is a second image produced using an item of data defining the first image. The second image may be identical to the first image, or it may be modified by loss of resolution, by changing the data defining the first image, or by other processes that result in a modified version.

Each location in an image may be called a "pixel." In an array defining an image in which each item of data provides a value, each value indicating the color of a location may be called a "pixel value." A pixel's value in an image that is a version of another image may indicate an attribute of a region of the other image that includes the pixel.

Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used.

A "connected component" or "blob" is a set of pixels within a data array defining an image, all of which are connected to each other through an appropriate rule such as that they are neighbors of each other or are both neighbors of other members of the set. A connected component of a binary form of an image can include a connected set of pixels that have the same binary value, such as black. A "bounding box" for a connected component is a rectangle just large enough to include all the pixels in the connected component, and can be specified by coordinates.

A "constraint" on parts of images or of image sets or on features shown by images or by image sets is a requirement or other limitation that the parts or features must satisfy.

An operation uses data to "determine" whether a proposition is true if the operation uses the data to obtain other data indicating whether the proposition is true. For example, an operation can use data defining an image to determine whether parts of the image satisfy a constraint, in which case the operation will obtain data indicating whether the image includes parts that satisfy the constraint.

A criterion is an example of a constraint. If a criterion "requires" a part of an image or of an image set with a characteristic or that has a characteristic, only parts with the characteristic or that have the characteristic meet the criterion.

A first item of data is produced by "applying a criterion" to a second item of data when the first item indicates whether the second item meets the criterion. An operation that applies a criterion produces such an item of data.

A criterion can be "applied" to a connected component or other part of an image or of an image set by applying the criterion to an item of data defining the image in a manner that depends on the connected component or other part. A connected component or other part of an image or of an image set "meets a criterion" if application of the criterion to the part produces an item of data indicating that the part meets the criterion. Numerous criteria can be applied to connected components and other parts of an image or of an image set. For example, a criterion can require a connected component to enclose more pixels or less pixels than the pixels in the connected component; a criterion can require a connected component to be the connected component nearest to another connected component; or a criterion can require a connected component to have a length that is greater than its distance to another connected component.

An operation includes a "sequence of iterations" when the operation includes a sequence of substantially similar suboperations, each referred to as an "iteration," where each iteration after the first uses starting data produced by the preceding iteration to obtain ending data. Each iteration's ending data can in turn be used by the following iteration. A "change occurs" during an iteration if the iteration's ending data is different than its starting data; an iteration during which no change occurs can be the last iteration, because no change will occur during further iterations.

A sequence of iterations "propagates" a constraint if each iteration includes an operation that determines whether items indicated by its starting data satisfy the constraint, and obtains ending data that indicates only the items that satisfy the constraint. For example, if the starting data and ending data define images, the ending data could define an image that includes only the parts of the starting image that satisfy the constraint.

An operation uses data to "determine" whether a proposition is true if the operation uses the data to obtain other data indicating whether the proposition is true. For example, an operation can use data defining an image showing a graphical feature to determine whether the graphical feature satisfies a constraint, in which case the operation will obtain data indicating whether the graphical feature satisfies the constraint.

"Image input circuitry" is circuitry for obtaining data defining images as input.

An "image input device" is a device that can receive an image and provide an item of data defining a version of the image. A "scanner" is an image input device that receives an image by a scanning operation, such as by scanning a document.

"User input circuitry" or "user interface circuitry" is circuitry for providing signals based on actions of a user. User input circuitry can receive signals from one or more "user input devices" that provide signals based on actions of a user, such as a keyboard, a mouse, a joystick, a touch screen, and so forth. The set of signals provided by user input circuitry can therefore include data indicating mouse operation, data indicating keyboard operation, and so forth. Signals from user input circuitry may include a "request" for an operation, in which case a system may perform the requested operation in response.

"Image output circuitry" is circuitry for providing data defining images as output.

An "image output device" is a device that can provide output defining an image.

A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image.

A "printer" is an image output device that provides an output image in the form of marks on a marking medium.

The terms "horizontal" and "vertical" are used in related senses in relation to an image that includes two approximately orthogonal prominent directions. If an image has a preferred orientation during viewing by a human, the horizontal is a prominent direction that extends from side to side when the image is at the preferred orientation; the vertical is a prominent direction that extends from above to below or vice versa when the image is at the preferred orientation. If an image has no preferred orientation, the assignment of the terms "horizontal" and "vertical" to orthogonal prominent directions is arbitrary.

The terms "row" and "column" are similarly used in related senses in relation to an image: In an image with a preferred orientation during viewing by a human, a row is a horizontally extending feature that includes a number of positions at which information can be represented; a column is a vertically extending feature that includes a number of positions at which information can be represented. If an image has no preferred orientation, the assignment of the terms "row" and "column" to orthogonally extending features with positions at which information can be represented is arbitrary.

A "combination of a row and a column" or a "row/column combination" is a pairing of a row and a column that both include one position at which information can be represented. The position may be called the "intersection" of the row and the column in the combination.

A "row/column representation" is a graphical representation that includes rows and columns and represents information for row/column combinations. The following categories of graphical representations are examples of row/column representations: tables, matrices, arrays, calendars, two-dimensional connection diagrams, puzzles such as crossword puzzles, or game diagrams such as chess or checkers diagrams, go game diagrams, or ticktacktoe games.

The term "content" refers to information represented by a graphical representation's configuration.

A part of an image is "between" lines when the directions from the part to the nearest point on each of the lines are approximately opposite.

B. General Features

Figure 2:
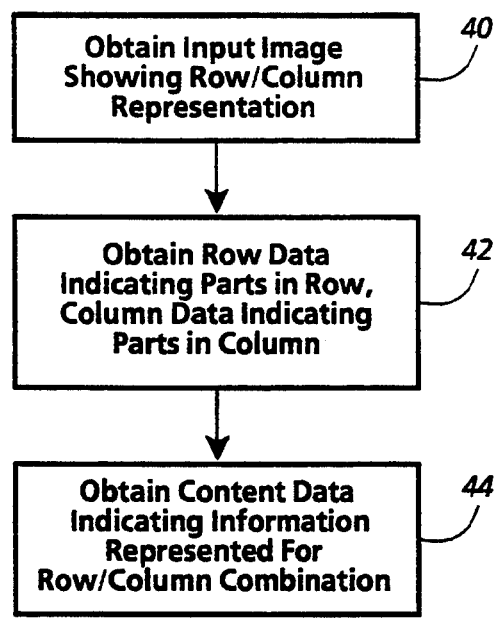
FIG. 2 is a flow diagram showing general acts in analyzing an image showing a row/column representation.
Figure 3:
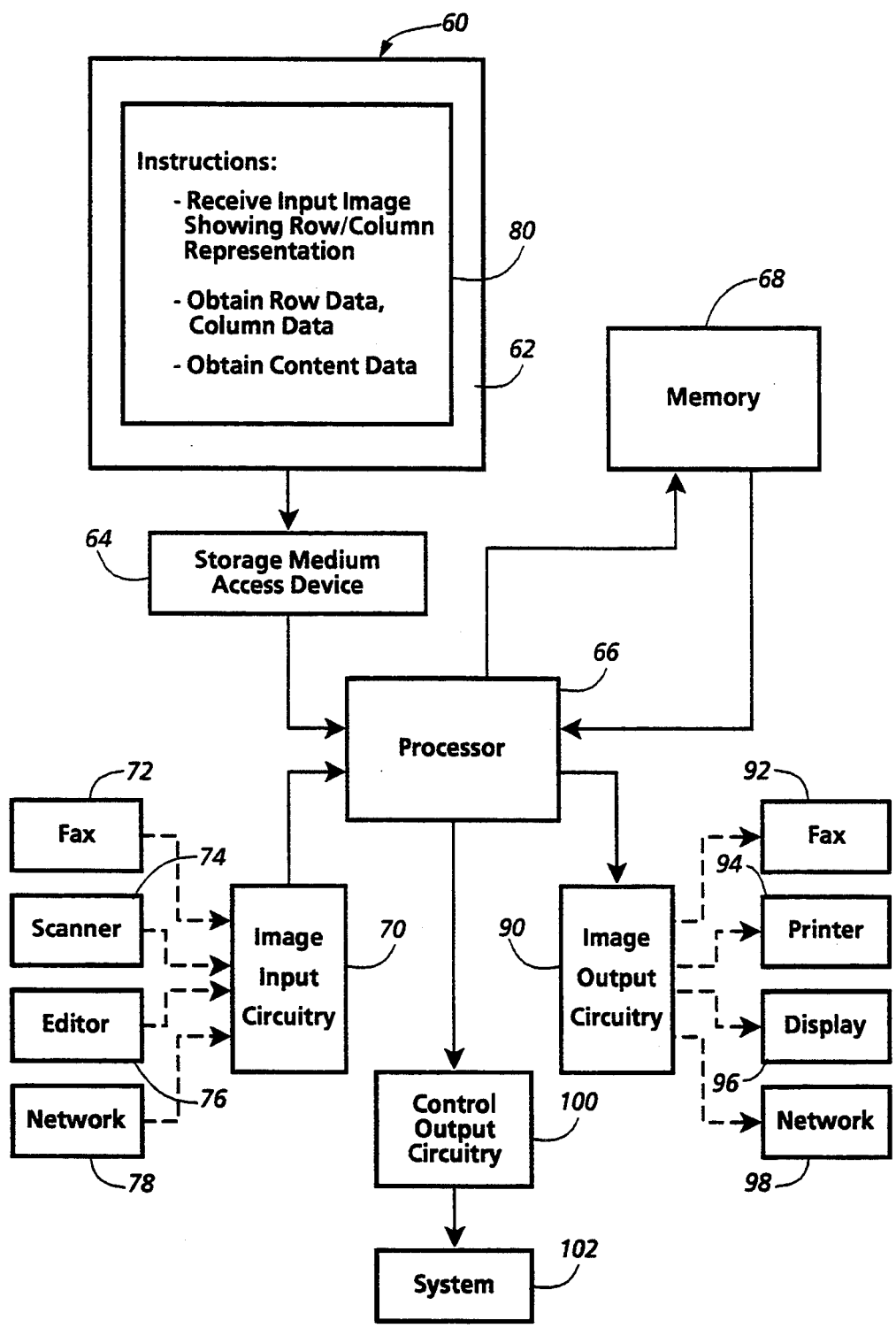
FIG. 3 is a schematic block diagram showing general components of a software product and a machine in which the software product can be used to implement the general acts in FIG. 2.

FIGS. 1-3 show general features of the invention. FIG. 1 shows schematically how an image showing a row/column representation can be analyzed. FIG. 2 shows general acts in analyzing an image showing a row/column representation. FIG. 3 shows general components of a software product and of a machine in which it can be used.

In FIG. 1, image 10 shows row/column representation 12. Image 10 can, for example, be a sketch. Row/column representation 12 illustratively includes two rows and two columns if the rows and columns are features between horizontal and vertical lines, and three rows and three columns if the rows and columns are features that include horizontal and vertical lines. A machine receiving data defining image 10 can respond by automatically obtaining row data 20 indicating parts of image 10 that are within row m. The machine can also automatically obtain column data 22 indicating parts of image 10 that are within column n. The machine can automatically use row data 20 and column data 22 to obtain content data 24 indicating information represented by row/column representation 12 for the combination of row m and column n.

The general acts in FIG. 2 begin in box 40 by receiving input image data defining an input image that shows a row/column representation. In response, the act in box 42 uses the input image data to obtain row data indicating parts of the input image within a row of the row/column representation and column data indicating parts of the input image within a column of the row/column representation. The act in box 44 then uses the row data and column data to obtain content data indicating information represented by the row/column representation for the combination of the row and the column.

FIG. 3 shows software product 60, an article of manufacture that can be used in a system that includes components like those shown in FIG. 3. Software product 60 includes data storage medium 62 that can be accessed by storage medium access device 64. Data storage medium 62 could, for example, be a magnetic medium such as a set of one or more tapes, diskettes, or floppy disks; an optical medium such as a set of one or more CD-ROMs; or any other appropriate medium for storing data.

Data storage medium 62 stores data that storage medium access device 64 can provide to processor 66. Processor 66 is connected for accessing memory 68, which can include program memory storing data indicating instructions that processor 66 can execute and also data memory storing data that processor 66 can access in executing the instructions.

Processor 66 is also connected for receiving data defining images from image input circuitry 70. The data could be obtained from facsimile (fax) machine 72; from scanner 74; from editor 76, which could be a forms editor or other interactive image editor controlled by user input devices such as a keyboard and mouse or a pen- or stylus-based input device; or from network 78, which could be a local area network or other network capable of transmitting data defining an image.

In addition to data storage medium 62, software product 60 includes data stored by storage medium 62. The stored data include data indicating image processing instructions 80, which processor 66 can execute to perform acts like those in FIG. 2. In executing instructions 80, processor 66 receives input image data defining an input image from image input circuitry 70. The input image shows a row/column representation. Processor 66 uses the input image data to obtain row data indicating parts of the input image within a row of the row/column representation and column data indicating parts of the input image within a column of the row/column representation. Processor 66 then uses the row data and column data to obtain content data indicating information represented by the row/column representation for the row/column combination.

Processor 66 can also be connected for providing data defining images to image output circuitry 90. For example, software product 60 could include data indicating instructions processor 66 can execute to use the content data to obtain output image data defining an output image. The output image could show a table or other representation showing the information represented for each row/column combination, for example. The output image data could be provided to image output circuitry 90, and could in turn be provided to fax machine 92, to printer 94, to display 96, or to network 98.

The content data could also be used to provide control signals. For example, memory 68 could store control instructions processor 66 can execute to use the content data to obtain control data defining control signals. The control data could be provided to control output circuitry 100, which could respond by providing control signals to system 102.

Rather than being used immediately, the content data could instead be stored in memory 68 for possible future use. This would be appropriate, for example, where information indicating an operation to be performed on an input image has not been obtained at the time data defining the input image is received.

C. Implementation

The general features described above could be implemented in numerous ways on various machines to analyze row/column representations. An implementation described below analyzes row/column representations and uses the results to control a graphic rendering system.

1. Image Showing Row/Column Representation

Figure 4:
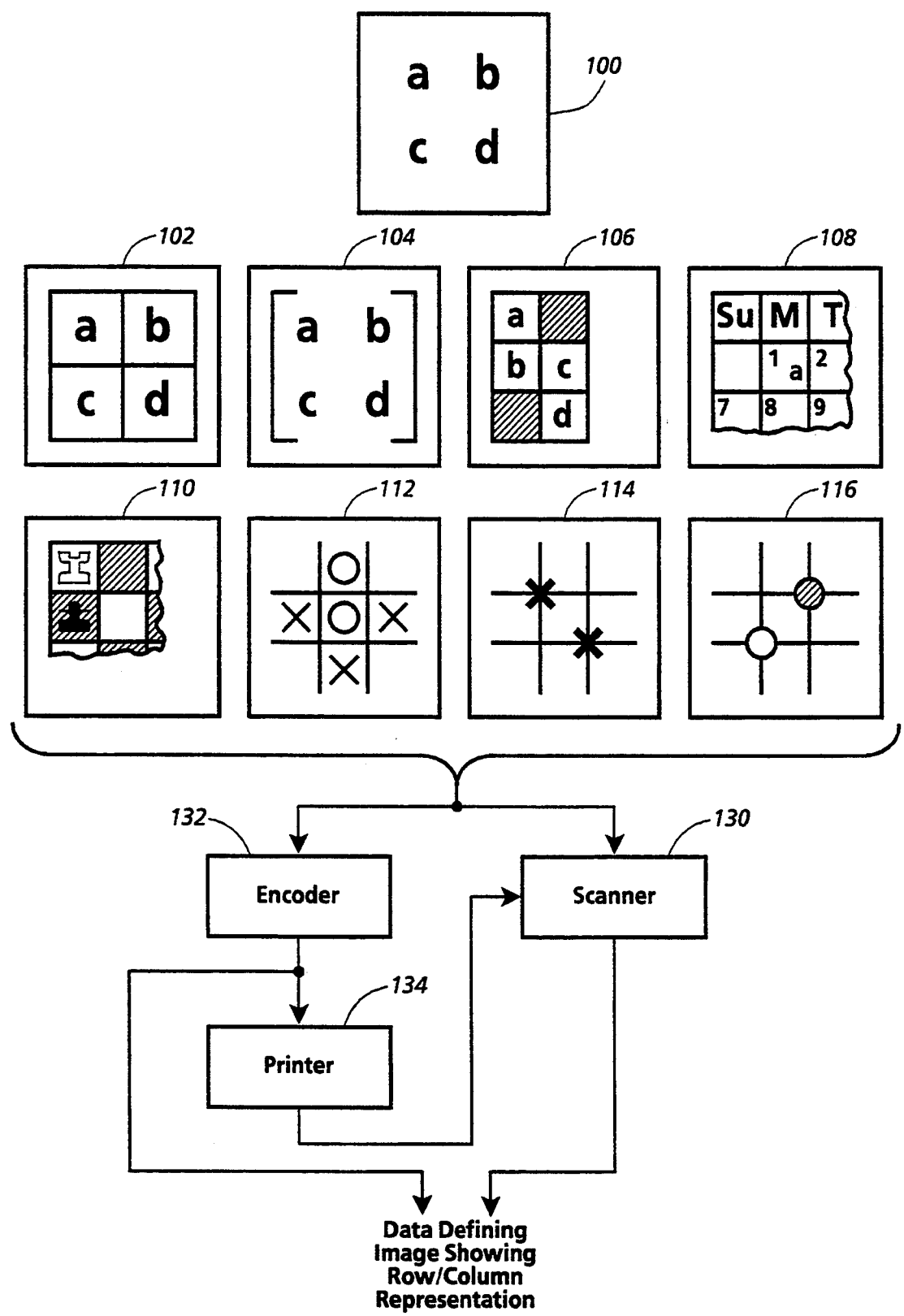
FIG. 4 is a schematic block diagram showing ways in which a user can provide data defining an image showing a row/column representation made by hand.
Figure 5:
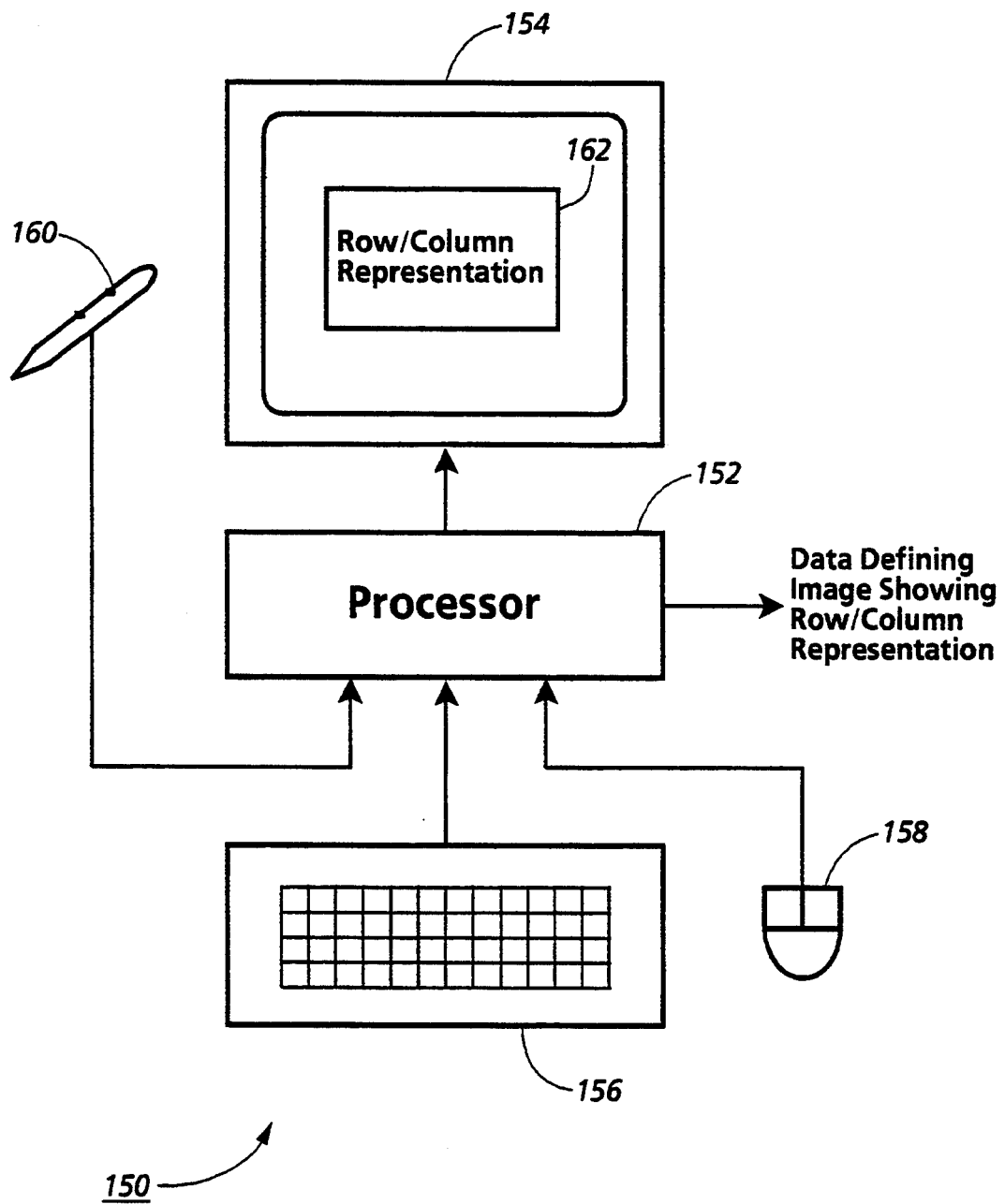
FIG. 5 is a schematic block diagram showing how a user can provide data defining an image showing a row/column representation produced interactively with a machine.

Data defining an image set showing a row/column representation can be obtained in many ways. FIG. 4 illustrates ways in which a user can provide an image showing a hand sketch of a row/column representation. FIG. 5 illustrates ways in which a user can provide an image showing a row/column representation by interacting with a machine.

FIG. 4 shows at the top several examples of images showing row/column representations. Image 100 shows an array with two rows and two columns; for each row/column combination, the array includes a feature, illustratively a character. Image 102 shows a table with two rows and two columns; for each row/column combination, the table includes a rectangle containing a feature, illustratively a character. Image 104 shows a matrix with two rows and two columns, enclosed by brackets at left and right; for each row/column combination, the matrix includes a feature, illustratively a character. Image 106 shows a crossword puzzle with three rows and two columns; for each row/column combination, the puzzle includes a square, with some squares shaded and others filled in with characters. Image 108 shows an excerpt from a calendar with rows for weeks and a column for each day of the week; for each row/column combination, the calendar includes a rectangle large enough to include a number for a day of the month and additional information, illustratively a character for the first day of the month. Image 110 shows an excerpt from a chess diagram; for each row/column combination, the diagram includes a square, with alternate squares white and shaded as in a checkerboard, and with some squares including symbols for chess pieces. Image 112 shows a tic-tac-toe game with three rows and three columns; for each row/column combination, the puzzle includes an area bounded on at least two sides, with some areas blank and others filled in with "O" or "X". Image 114 shows an excerpt from a circuit diagram of a programmable logic array (PLA) or another such array of circuitry with input lines extending in one direction and output lines extending in the other, defining rows and columns of intersections; some intersections are unmarked, but others are marked with an "X" to indicate a connection. Image 116 shows an excerpt from a go game diagram with horizontal and vertical lines forming rows and columns of intersections; some intersections are vacant, but others are covered with a white or black circle to indicate a white or black stone. As suggested by the examples, a wide variety of row/column representations can be formed.

In general, the images in FIG. 4 can be obtained in any appropriate way. For example, the row/column representations can be sketches produced by marking actions performed on a marking medium by hand.

If the marking medium is a sheet, scanner 130 can receive the sheet. Scanner 130 operates on the sheet to provide data defining an image showing a row/column representation.

If the marking medium is a marking surface of an electronic device that can sense marks, encoder 132 can receive signals from the electronic device and use the signals to obtain data defining an image showing a row/column representation. This data can then be provided to printer 134 to obtain a sheet on which marks are printed, and this sheet can be provided to scanner 130. Scanner 130 provides data defining an image showing a row/column representation.

FIG. 4 also shows that data from encoder 132 could be used directly as data defining an image showing a row/column representation. This would be appropriate if encoder 132 could provide data defining an image in response to marking actions.

FIG. 5 shows machine 150, which could be a personal computer, a workstation, or another data processing system. Machine 150 includes processor 152; display 154; keyboard 156; pointing device 158, illustratively a mouse; and screen position indicating device 160, illustratively a stylus. A user can operate keyboard 156 and pointing device 158 to provide signals to processor 152. Or a user can perform marking actions with screen position indicating device 160 on the surface of display 154 to provide signals to processor 152. In response, processor 152 presents and modifies image 162 on display 154, so that the user can continue to provide signals until image 162 shows a desired row/column representation. Then the user can provide a signal requesting that processor 152 provide data defining image 162.

Processor 152 could execute a number of types of software to permit a user to produce an image in the manner described above. Processor 152 could execute document editing software or image editing software, for example. Data defining an image showing a row/column representation could be produced in any of the ways shown in FIGS. 4 and 5 or in any other appropriate way.

2. System

Figure 6:
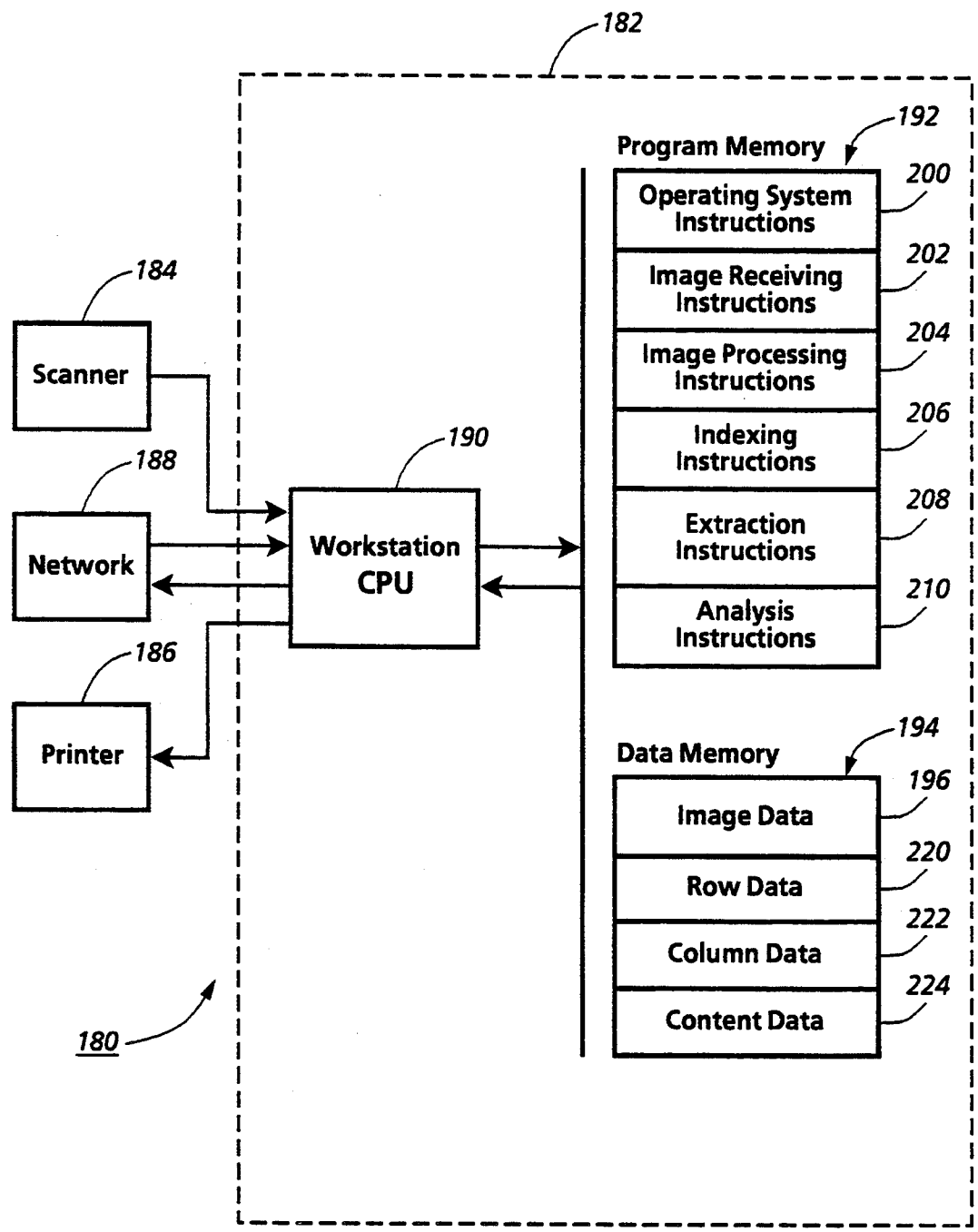
FIG. 6 is a schematic block diagram of a machine that can analyze an image showing a row/column representation.

FIG. 6 shows a system in which the general features described above have been implemented.

System 180 in FIG. 6 includes workstation 182, a Sun SPARCStation 10 workstation. Scanner 184 can be a conventional scanner such as a Xerox Datacopy GS Plus scanner. Printer 186 can be a conventional printer such as a Xerox laser printer. Network 188 can be a conventional network operating in accordance with a standard protocol, such as the Ethernet protocol.

Workstation CPU 190 is connected to receive data from scanner 184 and network 188 and is connected to provide data to printer 186 and network 188. For example, CPU 190 can receive data defining an image showing a row/column representation from scanner 184 as described above in relation to FIG. 4. Similarly, CPU 190 can receive data defining an image obtained in the manner described above in relation to FIG. 5 from network 188. In addition, workstation CPU 190 is connected to access program memory 192 and data memory 194 and other conventional workstation peripherals (not shown). Data memory 194 is illustratively storing image data 196 defining an image showing a row/column representation.

Program memory 192 stores instructions CPU 190 can execute to perform operations implementing the general acts in FIG. 2. CPU 190 executes operating system instructions 200 that provide a Unix operating system or other appropriate operating system. The other instructions stored by program memory 192 make calls to operating system instructions 200 in a conventional manner. In general, the instructions can be obtained from source code in a conventional programming language such as Lisp, C, or the like with conventional compiler or interpreter techniques that produce object code. A machine can store data indicating the source code or the resulting object code on a data storage medium in manufacturing a software product as described above in relation to FIG. 3, with the source code or object code being stored for access by a storage medium access device when the software product is used in a machine like system 180.

In executing image receiving instructions 202, CPU 190 receives data defining an image and stores it in data memory 194, as illustrated by image data 196. The data defining the image may be received from scanner 184 or network 188.

In executing image processing instructions 204, CPU 190 calls indexing instructions 206 and content extraction instructions 208. Image processing instructions 204 also perform other operations relating to analysis of row/column representations.

In executing indexing instructions 206, CPU 190 calls analysis instructions 210 to perform basic geometric analysis of the image defined by image data 196, producing row data 220 and column data 222. Row data 220 indicate parts of the image within a row. Column data 222 indicate parts of the image within a column.

In executing content extraction instructions 208, CPU 190 can call analysis instructions 210 to perform basic geometric analysis of images defined by row data 220 and column data 222, producing content data 224. Content data 224 indicate information represented by the row/column representation for the row/column combination.

3. Row/Column Representation Analysis

Figure 7:
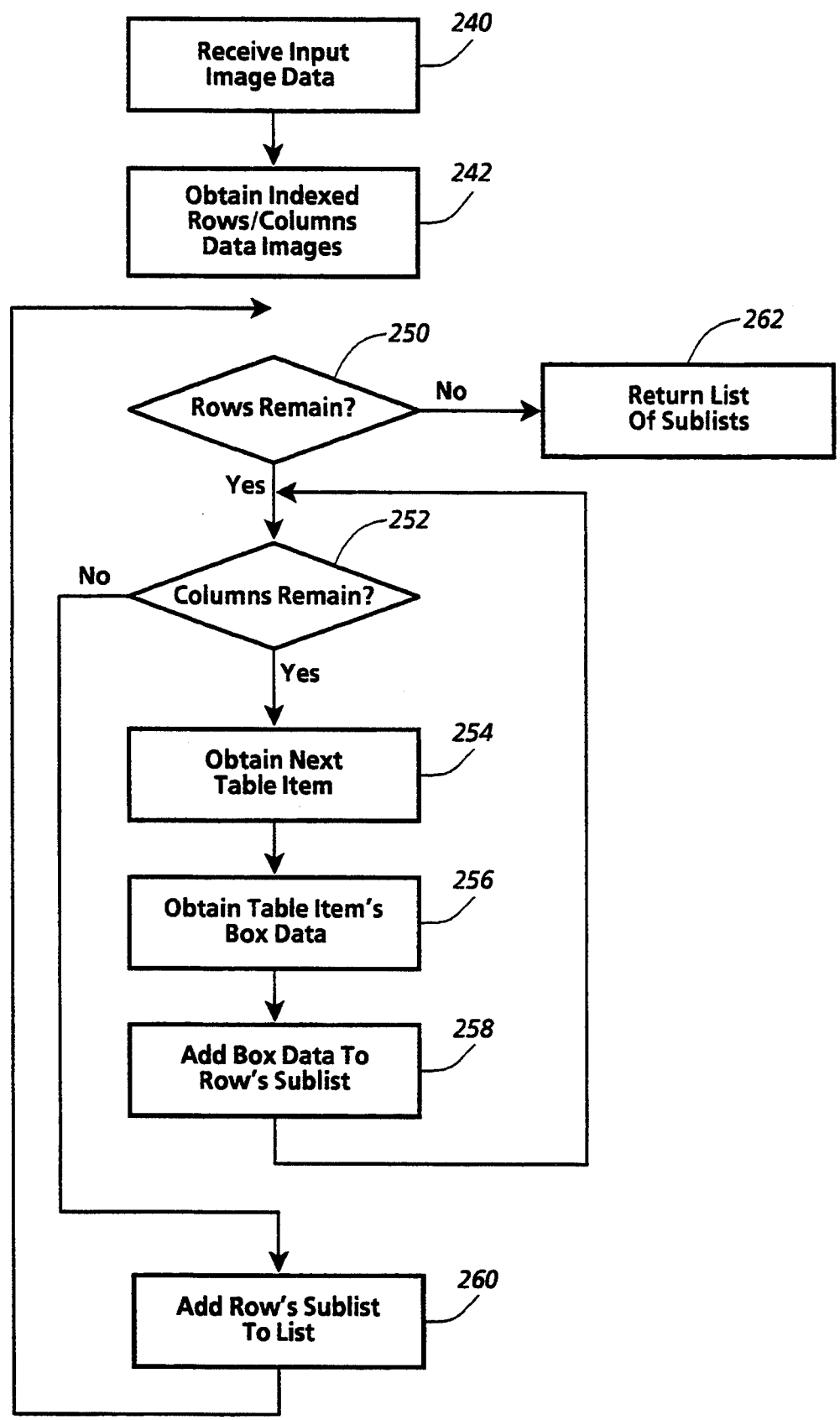
FIG. 7 is a flow chart of acts performed by the machine of FIG. 6.
Figure 8:
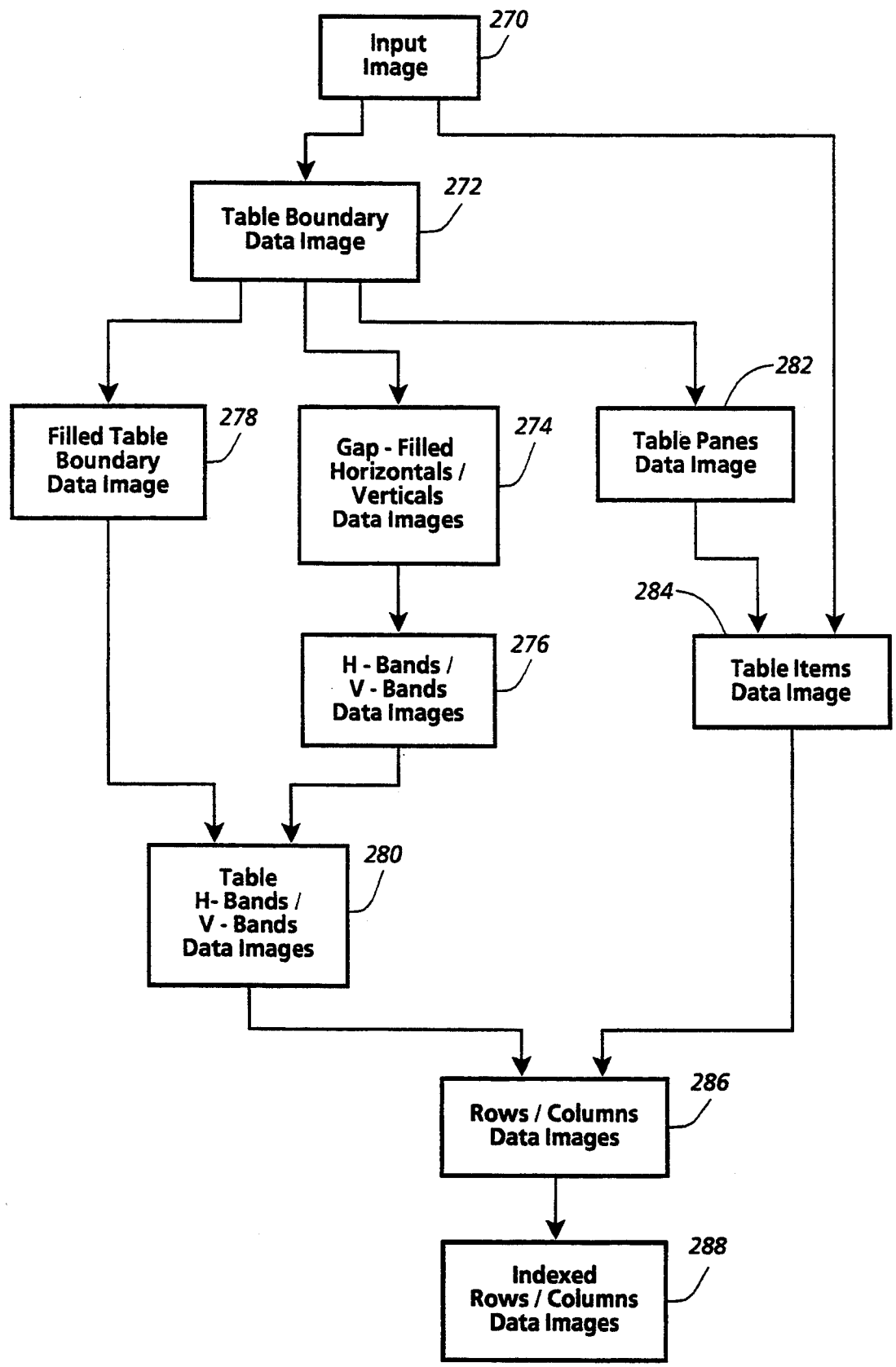
FIG. 8 is a schematic flow diagram of data images used in obtaining indexed rows and columns data images in FIG. 7.

FIG. 7 shows acts in executing image processing instructions 204 in FIG. 6. FIG. 8 shows acts in executing indexing instructions 206 in FIG. 6.

Many of the acts in FIGS. 7 and 8 are performed on items of data, each of which defines an image. Each item is referred to as a "data image." Some data images can be used in obtaining others. In general, all of the data images define images with the same number of pixels, and each operation produces an image with the same number of pixels. An operation on two images typically uses values of pairs of pixels to produce, for each pair, a pixel value in an image being produced; within each pair, one pixel is from each image and the two pixels in the pair are both at the same location as the pixel value in the image being produced. Many examples of such operations are described in copending, coassigned U.S. patent application No. 08/157,600, entitled "Analyzing an Image Showing a Node-Link Structure" ("the Node-Link Structure Application"), and in copending, coassigned U.S. patent application No. 08/157,804, entitled "Analyzing an Image Showing Editing Marks to Obtain Category of Editing Operation" ("the Editing Application"), both of which are incorporated herein by reference.

The act in box 240 in FIG. 7 begins by receiving data defining an input image. The input image data may have been received previously by executing image receiving instructions 202, and may be provided with a call to image processing instructions 204.

The act in box 242 uses the input image data from box 240 to obtain an indexed rows data image and an indexed columns data image. If the input image shows a row/column representation that meets certain constraints, the indexed rows data image includes, for each row, a connected component in which each pixel is labeled with a unique identifier for the row. Similarly, the indexed columns data image includes, for each column, a connected component in which each pixel is labeled with a unique identifier for the column. An implementation of the act in box 242 is discussed in greater detail below.

The act in box 250 begins an outer iterative loop that performs an iteration for each row's connected component in the indexed rows data image. The act in box 252 begins an inner iterative loop that performs an iteration for each column's connected component in the indexed columns data image.

The act in box 254 begins each inner iteration by obtaining a table item data image showing a table item that is in both the row and in the column currently being handled. The act in box 254 can be implemented by comparing the unique identifier of the current row with each pixel's label in the indexed rows data image to obtain a current row data image in which each pixel in the current row's connected component is ON; the act in box 254 can also compare the unique identifier of the current column with each pixel's label in the indexed columns data image to obtain a current column data image in which each pixel in the current column's connected component is ON. The act in box 254 can then AND the current row data image, the current column data image, and a table items data image showing the items in the table to obtain the table item data image. The table items data image can be obtained as discussed below in relation to the implementation of the act in box 242.

The act in box 256 then uses the table item data image from box 254 to obtain box data indicating the table item's bounding box. The box data can be a list of four items—a left x coordinate, a top y coordinate, a width, and a height. The act in box 258 then adds the box data from box 256 to a sublist of boxes for the row currently being handled. When all the columns have been handled for the current row, the act in box 260 adds the current row's sublist to a list of sublists, and when all the rows have been handled, the act in box 262 returns the list of sublists as the content data. The list of sublists indicates a bounding box for an item at each row/column combination, and the indicated bounding box can be used with the input image data from box 240 to obtain data defining an image of the item.

FIG. 8 shows how the act in box 242 in FIG. 7 can be implemented. Each box in FIG. 8 represents a data image. Input image data 270 is received from box 240 in FIG. 7.

The act in box 242 can obtain table boundary data image 272 by selecting a connected component that has the largest bounding box. The act in box 242 can label each connected component in input image 270 with a unique identifier as described in relation to FIG. 7 in the Node-Link Structure Application. Then, each connected component can be handled separately to obtain a bounding box area that is the product of the box width and height. The act in box 242 can perform a spread operation as described in relation to FIG. 7 in the Node-Link Structure Application to label the pixels in each connected component with the connected component's bounding box area. The act in box 242 can obtain the maximum bounding box area, and can compare each pixel's label from the spread operation with the maximum bounding box area, keeping a pixel ON if its label is equal to the maximum to obtain table boundary data image 272.

The act in box 242 can then use table boundary data image 272 to obtain gap-filled horizontal and vertical data images 274. The act in box 242 can first use table boundary data image 272 to obtain a horizontal non-gap data image and a vertical non-gap data images. The act in box 242 can then use the horizontal and vertical non-gap data images to obtain horizontals and verticals data images. The act in box 242 can then perform a gap fill operation on each of these data images to obtain gap filled horizontals and verticals data images 274.

The act in box 242 can obtain the horizontal non-gap data image by first using table boundary data image 272 to obtain a skeleton data image. The act in box 242 can first obtain the complement of table boundary data image 272, then use the complement to obtain four partial edge data images as described in relation to FIG. 7 in the Node-Link Structure Application. The partial edge data images can then be used to obtain an edge direction data image in which pixels on edges in opposite directions are labeled differently.

The act in box 242 can obtain a horizontal maximum data image by taking, at each pixel, the maximum of the value from the −x partial edge data image and twice the value from the +x partial edge data image. Similarly, the act in box 242 can obtain a vertical maximum data image by taking, at each pixel, the maximum of the value from the −y partial edge data image and twice the value from the +y partial edge data image. To obtain revised horizontal and vertical maximum data images in which spurious edges are suppressed, the act in box 242 can obtain a differences data image for each of the horizontal and vertical maximum data images, and can gate the value at each pixel of the horizontal and vertical maximum data images by the value at the same pixel in the complement of the respective differences data image; in the differences data image, a pixel is ON if it has a four-neighbor with a distinct non-zero value in the maximum data image from which it was obtained. Finally, the act in box 242 can perform a read operation to obtain resulting data images in which each pixel is labeled with the value of the revised horizontal or vertical maximum data image at the nearest neighboring ON pixel in the complement of table boundary data image 272; obtain a differences data image for each resulting data image; and obtain the skeleton data image as the union of the differences data images.

The act in box 242 can use the skeleton data image to obtain two partial edge data images in the +y and −y directions as described in relation to FIG. 7 in the Node-Link Structure Application. The act in box 242 can obtain two intersection data images, one by intersecting the +y partial edge data image with a translation of the −y partial edge data image by one pixel in the −y direction, the other by intersecting the −y partial edge data image with a translation of the +y partial edge data image by one pixel in the +y direction. Then the act in box 242 can take the union of the intersection data images, obtaining a union data image.

The act in box 242 use the union data image to obtain a horizontally grown data image in which any pixel is ON if it was within two pixels in a horizontal direction from an edge between an ON pixel and an OFF pixel that are horizontal neighbors. The act in box 242 can take the intersection of the skeleton data image with the horizontally grown data image, and can then take the union of the resulting data image with the union data image to obtain a horizontal non-gap data image in which a two-pixel wide gap at a crossing has been eliminated.

The act in box 242 can similarly obtain the vertical non-gap data image using the same skeleton data image to obtain two partial edge data images in the +x and −x directions; obtaining two intersection data images; taking the union of the intersection data images; taking the intersection of the skeleton data image with a vertically grown data image obtained from the union data image; and taking the union of the resulting data image with the union data image to obtain the vertical non-gap data image.

The act in box 242 can then obtain a vertical subset data image showing connected components in the vertical non-gap data image that are completely included in connected components in the horizontal non-gap data image. The act in box 242 can then perform a set difference operation to remove the vertical subset data image from the horizontal non-gap data image, obtaining a vertical-free horizontals data image.

The act in box 242 can similarly obtain a horizontal subset data image showing connected components in the horizontal non-gap data image that are completely included in connected components in the vertical non-gap data image. The act in box 242 can then perform a set difference operation to remove the horizontal subset data image from the vertical non-gap data image, obtaining a horizontal-free verticals data image.

Each subset data image can be obtained from a first image and a second image by first performing a set difference operation to remove the first image from the second image, obtaining a seed data image. The seed data image is then used in a coloring operation to obtain a version of the second image in which pixels are ON in the connected components that include parts of the second image that are not within connected components in the first image. This version can then be removed from the second image to obtain the subset data image showing connected components of the second image that are subsets of connected components in the first image.

The act in box 242 can then use the vertical-free horizontals data image and the horizontal-free verticals data image to obtain horizontals and verticals data images, respectively. For example, the act in box 242 can obtain two distances data images as described in relation to FIG. 7 of the Node-Link Structure Application, a first one in which each pixel is labeled with the distance to the nearest connected component in the vertical-free horizontals data image and a second one in which each pixel is labeled with the distance to the nearest connected component in the skeleton data image. The distances data images are used to obtain an exclusive closer data image in which a pixel is ON if its distance in the first distances data image is smaller than its distance in the second distances data image, so that the skeleton is grown out to the full width of the curve in those parts indicated by the vertical-free horizontals data image. The act in box 242 then obtains the intersection of table boundary data image 272 and the exclusive closer data image to obtain the horizontals data image. The act in box 242 can similarly use the horizontal-free verticals data image to obtain the verticals data image.

The act in box 242 can perform a gap fill operation on the horizontals data image and table boundary data image 272 using a gap fill radius such as five pixels. If a gap between two ON pixels in the horizontals data image is less than the gap fill radius and if the two ON pixels are in the same connected component in table boundary data image 272, the gap fill operation connects the two ON pixels with other ON pixels extending between them, obtaining a gap filled horizontal data image. Similarly, the act in box 242 can perform a gap fill operation on the verticals data image and table boundary data image 272 using the same gap fill radius, obtaining a gap filled vertical data image.

The act in box 242 can use gap filled horizontal and vertical data images 274 to obtain h-band and v-band data images 276. A pixel is ON in the h-band data image if it has nearest neighbors both in the +y and −y directions in the gap filled horizontal data image. Similarly, each pixel is ON in the v-band data image if it has nearest neighbors both in the +x and −x directions in the gap filled vertical data image.

The act in box 242 can also use table boundary data image 272 to obtain filled data image 278. A filled data image is described in relation to FIG. 7 of the Node-Link Structure Application.

The act in box 242 can then AND h-band and v-band data images 276 and filled data image 278 to obtain table h-band and v-band data images 280. A pixel is ON in the table h-band data image if it is ON both in the h-band data image and in filled data image 278. A pixel is ON in the table v-band data image if it is ON both in the v-band data image and in filled data image 278.

The act in box 242 can also use table boundary data image 272 to obtain table panes data image 282. The act in box 242 can use table boundary data image 272 to obtain a holes data image and an internals data image, as described in relation to FIG. 7 of the Node-Link Structure Application. Then the act in box 242 can take the union of the holes data image and the internals data image to obtain table panes data image 282 as a filled holes data image.

The act in box 242 can AND input image 270 and table panes data image 282 to obtain table items data image 284. In other words, table items data image 284 shows connected components that are within the panes of the table.

Alternatively, the act in box 242 could obtain table items data image 284 by obtaining an internals data image from table boundary data image 272. The operation of obtaining an internals data image is described in relation to FIG. 7 of the Node-Link Structure Application.

The act in box 242 can use table h-band and v-band data images 280 and table items data image 284 to obtain rows and columns data images 286 by applying row constraints and column constraints as appropriate. For example, to distinguish rows and columns from narrow separator bands, a column constraint can include a width criterion requiring a column to be wider than the narrowest set of items in any column and a height criterion requiring the column to have a height greater than the shortest height of the set of items in any column; similarly, a row constraint can include a height criterion requiring a row to be taller than the shortest set of items in any row and a width criterion requiring the row to have a width greater than the smallest width of the set of items in any row.

As a result of applying such criteria, each pixel is ON in the rows data image if it is within the x and y span of one of the connected components in the table h-band data image that has x and y spans greater than the minimum spans of the set of connected components in table items data image 284 that are within the same connected component in the table h-band data image. Similarly, each pixel is ON in the columns data image if it is within the x and y span of one of the connected components in the table v-band data image that has x and y spans greater than the minimum spans of the set of connected components in table items data image 284 that are within the same connected component in the table v-band data image.

Finally, the act in box 242 can use rows and columns data images 286 to obtain indexed rows and columns data images 288.

The act in box 242 can use the rows data image to obtain an up edges data image in which each pixel is ON if it is at an upward edge of a connected component in the rows data image. The act in box 242 can then perform a project operation, labeling each pixel that is ON in the up edges data image with one more than the number of pixels above it that are ON, similar to the project operations described in relation to FIG. 7 of the Node-Link Structure Application. Then the act in box 242 can use the resulting data image to perform a spread operation, labeling each pixel in a connected component in the rows data image with the maximum value of any of its pixels in the data image resulting from the project operation. Then, to obtain consecutive labels, the act in box 242 can label each pixel with a unique identifier starting with one, the unique identifiers being assigned in the same order as the labels from the spread operation, obtaining the indexed rows data image.

Similarly, the act in box 242 can use the columns data image to obtain a left edges data image in which each pixel is ON if it is at a leftward edge of a connected component in the columns data image. The act in box 242 can then perform a project operation, labeling each pixel that is ON in the left edges data image with one more than the number of pixels left of it that are ON. Then the act in box 242 can use the resulting data image to perform a spread operation, labeling each pixel in a connected component in the columns data image with the maximum value of any of its pixels in the data image resulting from the project operation. Then, the act in box 242 can label each pixel with a unique identifier starting with one, the unique identifiers being assigned in the same order as the labels from the spread operation, obtaining the indexed columns data image.

4. Examples

Figure 9:
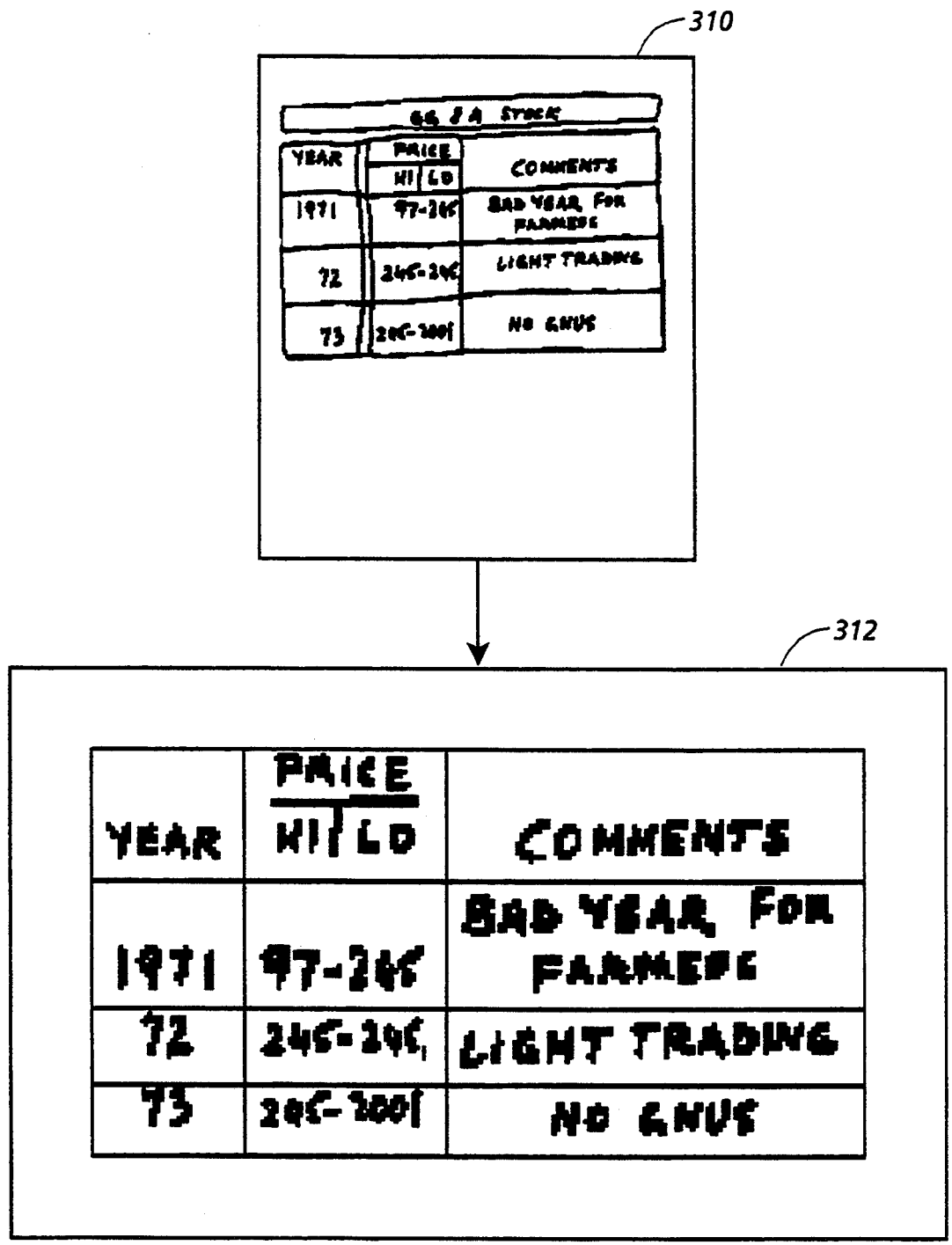
FIG. 9 shows an example of a sketch of a table and a precisely formed table obtained using techniques shown in FIGS. 6–8.

The list from box 262 in FIG. 7, indicating an item for each row/column combination, can be used for various purposes. For example, it can be used to obtain a precisely formed row/column representation, such as a table. FIG. 9 illustrates how a list obtained from a sketch of a table has been used to obtain a precisely formed table with items copied from within the sketch.

In FIG. 9, input image 310 shows a sketch of a row/column representation that is a table. The sketch includes a separate title bar across the top, four rows, and three columns. The first row includes headings for the columns, and the heading of the second column includes a subdivision into two parts. The table includes a double line between the first and second columns.

When a list of sublists is obtained from input image 310 as described above in relation to FIG. 7, the list can be used to produce output image 312. As shown, output image 312 also shows a table which includes the items from within the rows and columns of the sketched table in input image 310. The title bar, which was separate, is not included, the double line between the first and second columns is changed to a single line, and the heading of the second column is copied, including the lines forming its subdivision.

A rendering operation can produce a table as in output image 312 using a list of sublists like that returned in box 262 in FIG. 7. The rendering operation can begin by setting up a LaTex command string or other page description language (PDL) file which can be provided to a printer when completed. The rendering operation can then obtain the list of sublists. The rendering operation can go through the list of sublists to find the maximum height of the bounding boxes; the maximum height can then be used to scale all other heights to the size of the output. Then the rendering operation can perform an iterative loop to create a table string that can be included in the LaTex command string in the math mode.

The iterative loop can go through the bounding boxes in the list of sublists, obtaining a list of postscript files, each defining an item for a row/column combination, creating a LaTex table string. Each item can be scaled by dividing its bounding box height by the maximum height of the items, and then multiplying the result by a fixed height for the rows of the precisely formed table.

5. Variations

The implementation described above uses particular operations described above to obtain row data, column data, and content data from an image showing a row/column representation. Numerous other combinations of operations besides those described above could be used to obtain row data, column data, and content data.

The implementation described above can handle a row/column representation that meets certain constraints. For example, the table boundary must be the largest connected component in the image and must include approximately orthogonal sets of parallel lines that bound the rows and columns, and the table items must be contained within areas between the lines. The implementation could be modified to relax these constraints or to apply other constraints. In general, the terms "row" and "column" are interchangeable and row/column representations include any representation in which items are arranged so that each item is at an intersection of two orthogonal rows.

The implementation described above applies constraints on rows and columns to distinguish narrow row or column separators from rows and columns. Other criteria could be employed. Also, additional constraints could be applied to distinguish other features that may occur in a row/column representation.

The implementation described above can operate on a human-produced image showing a row/column representation that satisfies certain constraints. A machine could be implemented to produce a row/column representation satisfying the same constraints automatically, in which case the implementation could be applied to a machine-produced image.

To handle row/column representations such as a simple array without brackets as in image 100 in FIG. 4 or such as a matrix as in image 104 in FIG. 4, the implementation can be extended to first remove brackets or other such features to obtain a simple array, then to synthesize table boundaries that can be used as described in relation to FIGS. 7 and 8 above. The synthesized table boundaries can, for example, be produced using distances data images to obtain Voronoi boundaries, restricted to within a closed boundary that is large enough to enclose all of the array items and small enough to fit within the image. The gap filling operation described above in relation to FIG. 8 is important in this extension because the Voronoi boundaries do not necessarily define straight lines through an array. Before obtaining the Voronoi boundaries, a proximity grouping operation can be performed to group together the marks that form each item in the array, using clustering techniques like those described in copending, coassigned U.S. patent application No. 08/158,053, entitled "Analyzing an Image or Other Data to Obtain a Stable Number of Groups" ("the Grouping Application"), incorporated herein by reference. Alternatively, the rows and columns can be extracted by grouping proximity groups on the center of axis (COA) in the x or y direction. COA grouping is described in copending, coassigned U.S. patent application No. 08/158,062 entitled "Analyzing an Image Showing a Parallel Length Graph," incorporated herein by reference.

The implementation could similarly be extended to cover other representations, including representations like those shown by images 112, 114, and 116 in FIG. 4. For example, for a row/column representation like images 114 and 116, segmentation based on local width could be performed as described in the Grouping Application to obtain a lines data image showing pieces of lines and a figures data image showing the superimposed figures that have greater width. Then, assuming alignment, horizontal and vertical alignment grouping based on horizontal and vertical centers of area could be performed as described in the Grouping Application to obtain a horizontal line segments data image and a vertical line segments data image. Each of these data images could be ORed with the figures data image to obtain horizontal and vertical lines data images. A project operation, a coloring operation, or other operation as described above could be performed to obtain data images in which each horizontal or vertical line is labeled with a unique identifier. Finally, each connected component in the figures data image could be used to gate the labeled horizontal and vertical lines data images to obtain the unique identifiers of the horizontal and vertical lines that extend through it.

The implementation could also be extended to analyze a hierarchical representation, with the contents of an item for a row/column representation being itself analyzed as a row/column representation to obtain row data, column data, and content data as described above.

The implementation described above uses content data to produce an output image showing a table. The content data could instead be used to produce an output image showing some other type of graphical or textual representation of the information represented for each row/column combination.

The implementation described above handles information represented for a row/column combination as a raster bitmap, but the implementation could be extended to recognize characters using optical character recognition (OCR) or other appropriate recognition techniques, and data indicating characters or other features indicating information for a row/column combination could be returned.

The implementation described above uses currently available image processing techniques, but could readily be modified to use newly discovered image processing techniques as they become available.

The implementation described above operates on binary images, but could be extended to operate on color or gray scale images, either directly or after binarization.

The implementation described above uses the results of image analysis to control rendering, but image analysis results could be used for a variety of other purposes. For example, the results of image analysis could be stored to preserve a graphical representation generated during a meeting using a tool such as a computer-controlled whiteboard device, for which user interface techniques are described in copending, coassigned U.S. patent application Nos. 07/869,554, entitled "Generalized Wiping as a User Interface for Object-Based Graphical Displays," and 07/869,559, "Time-Space Object Containment for Graphical User Interface," both incorporated herein by reference.

The rendering back end of the implementation described above is based on LaTex commands for producing tables. It could alternatively be based on a collection of PostScript code fragment templates, made interactively using, for example, the IDRAW program in the X window system. Examples of such code fragments include code to draw axes of an X-Y graph and code to draw a bar in a bar chart. Parameters of a graphical representation are automatically inserted into a PostScript code fragment template, and data defining an output image with a more precise version of the graphical representation is obtained by invoking a sequence of PostScript code fragments according to the structure of a category that applies to the graphical representation. This approach is compatible with many PostScript-based drawing/rendering programs. To make an interface to a new drawing system, one would simply perform interactive operations to obtain a collection of PostScript code fragment template files.

One of the advantages of the implementation described above is that the user can draw a relatively simple sketch to indicate a relatively complicated graphical representation that can be rendered automatically in response to the sketch. Therefore, the sketch may not specify all the relevant parameters of the output image, making it necessary for parameters that are not specified to default sensibly. In the implementation described above, default parameters are supplied by rendering procedures. A user could instead provide defaults, such as in an initialization file. Defaults could be provided for specific categories and for specific rendering systems.

The implementation described above performs acts in a specific order that could instead be performed in another order. In FIG. 7, for example, the outer iterative loop could handle columns and the inner iterative loop could handle rows.

The implementation described above obtains content data in the form of a list of sublists, where each sublist includes items. Other types of content data can be obtained.

Figure 10:
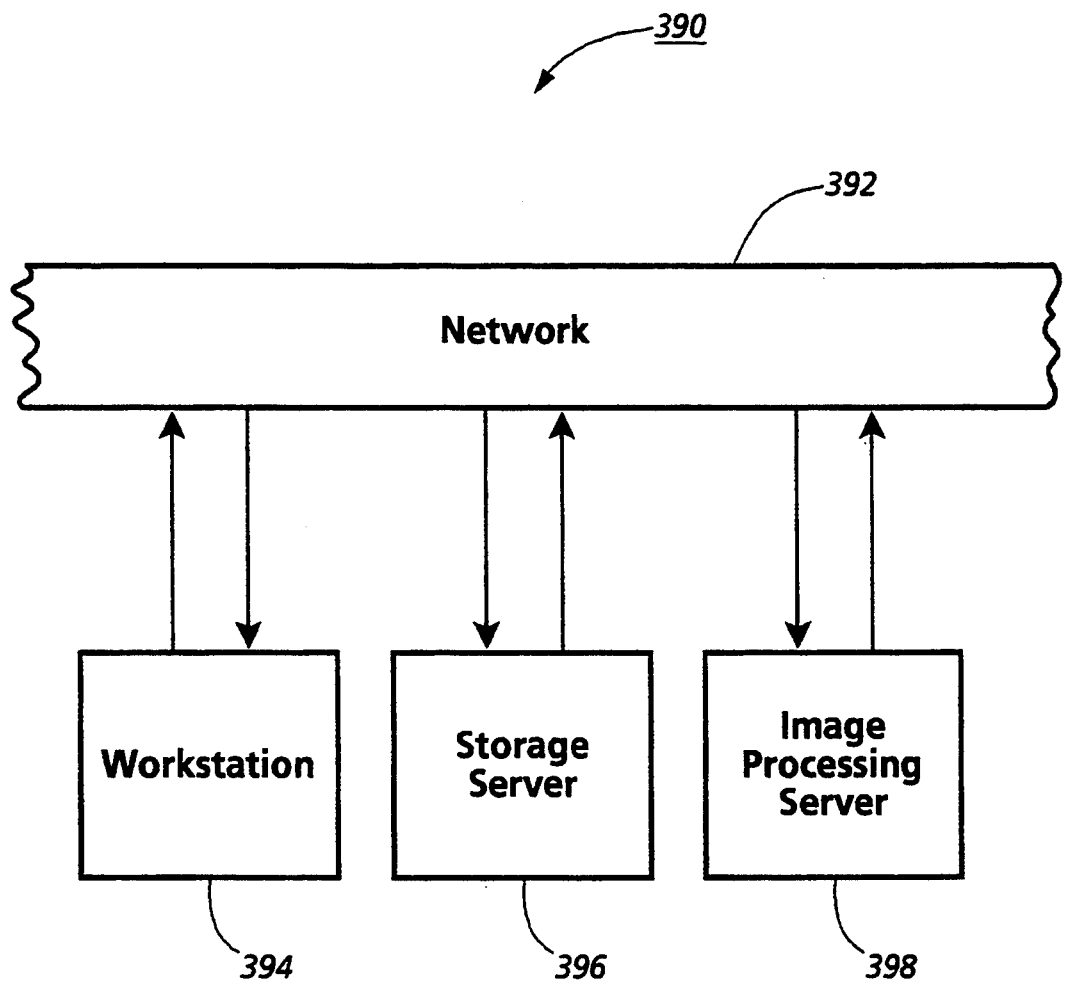
FIG. 10 is a schematic block diagram of an implementation with an image processing server.

The implementation described above in relation to FIG. 6 employs a workstation CPU that executes image processing instructions. FIG. 10 shows an alternative implementation that uses an image processing server. This implementation can provide the usual advantages of server architectures, including economy, speed, and sharing of resources.

System 390 in FIG. 10 includes network 392, workstation 394, storage server 396, and image processing server 398. A user can operate workstation 394 to provide requests on network 392 for storage of data defining images, such as from a scanner or other source. In response, storage server 396 can store the data. Then, the user can operate workstation 394 to provide requests for image processing operations like those described above. In response, image processing server 388 can perform the requested operations, executing instructions like those described above in relation to FIG. 6.

D. Application

Figure 11:
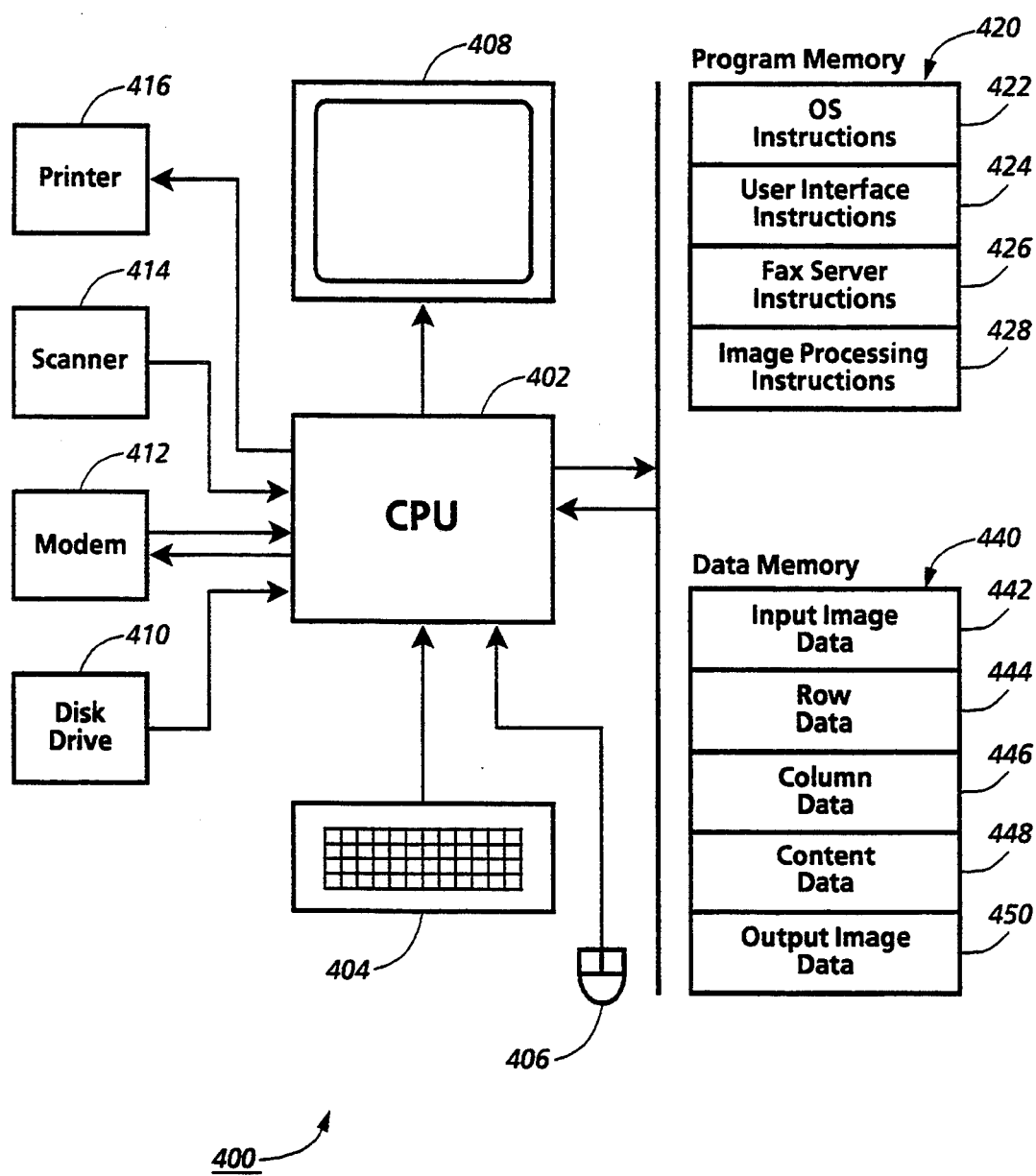
FIG. 11 is a schematic block diagram of a fax server application.
Figure 12:
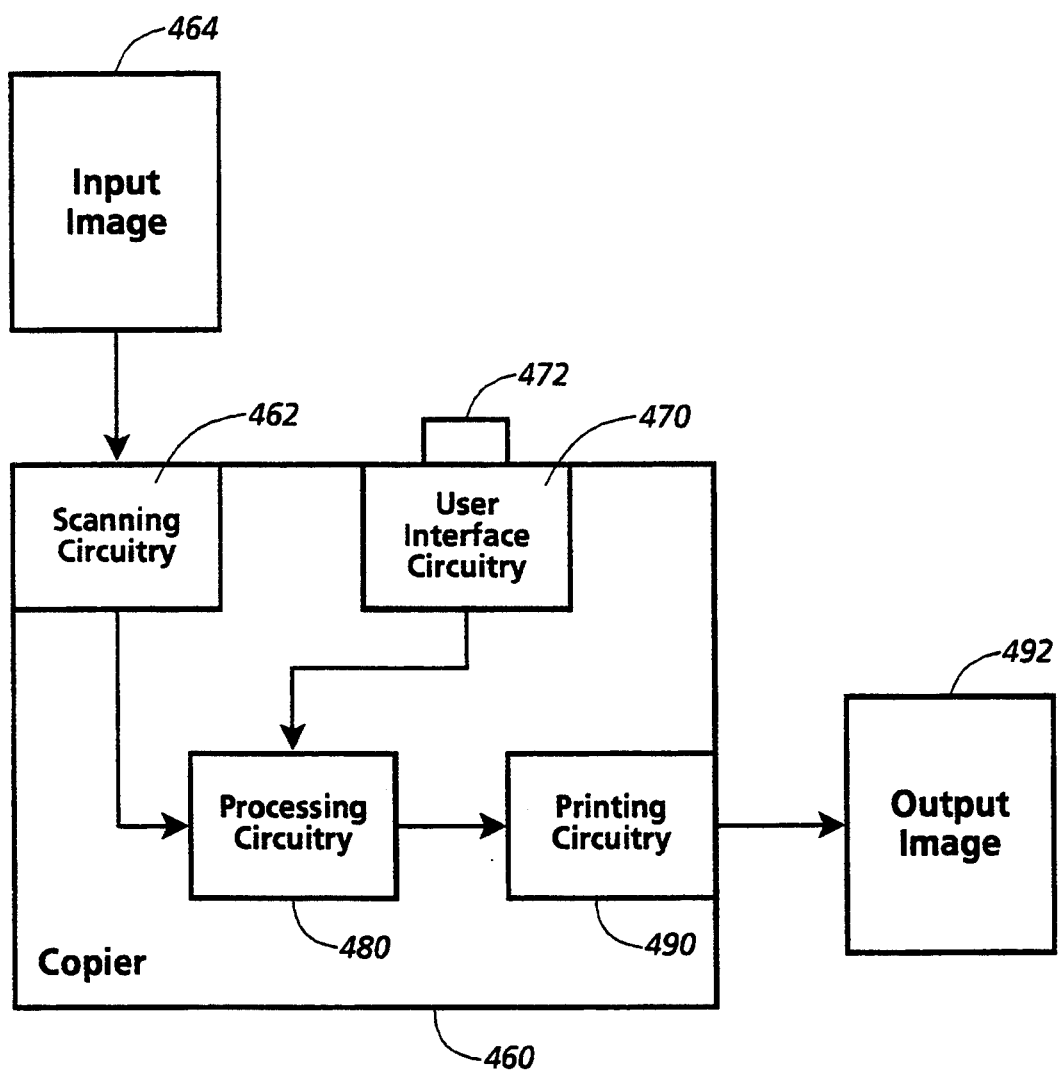
FIG. 12 is a schematic block diagram of a copier application.

The invention could be applied in many ways. FIG. 11 shows how the techniques described above could be applied in a personal computer that can operate as a fax server. FIG. 12 illustrates how the techniques described above could be applied in a copier.

System 400 in FIG. 11 includes CPU 402, which can be the CPU of a personal computer such as an IBM PC compatible machine. CPU 402 is connected to receive user input signals from keyboard 404 and mouse 406, and can present images to a user through display 408. CPU 402 is also connected to a number of other peripheral devices, illustratively including disk drive 410, modem 412, scanner 414, and printer 416.

Program memory 420 stores operating system (OS) instructions 422, which can be a version of DOS; user interface instructions 424; fax server instructions 426; and image processing instructions 428. Fax server instructions 426 can be similar to the PaperWorks ™ software product described in copending, coassigned U.S. patent application No. 08/096,198, entitled "Data Access Based on Human-Produced Images," incorporated herein by reference. Image processing instructions 428 can be implemented as described above in relation to image processing instructions 204 in FIG. 6 and in relation to FIGS. 7–9. Fax server instructions 426 and image processing instructions 428 could be obtained in the form of a software product stored on a floppy disk, diskette, or CD-ROM, and accessed for storage in program memory 420 by disk drive 410.

Data memory 440 stores input image data 442, row data 444, column data 446, and content data 448 as described above in relation to FIGS. 6–8. Data memory 440 can also store output image data 450 if image processing instructions 428 obtain data defining an output image as described above in relation to FIG. 9.

System 400 can obtain input image data 442 defining an image that shows a row/column representation in many ways: Data defining an image showing a row/column representation could be produced interactively as described above in relation to FIG. 5, such as by executing user interface instructions 424. Any appropriate user interface techniques could be used, including pen-based techniques. Data defining a previously produced image showing a row/column representation could be retrieved from a storage medium by disk drive 410. Data defining an image showing a row/column representation could be obtained from scanner 414 as described above in relation to FIG. 4. A user could produce data defining an image showing a row/column representation elsewhere and provide it to system 400 through modem 412, such as by making a facsimile transmission to modem 412.

CPU 402 could execute fax server instructions 426 in response to a request received by facsimile transmission through modem 412. The request could include a form indicating an analysis operation and also indicating an output image destination such as a fax machine or printer 416. The request could also include data defining an image showing a row/column representation or could indicate an image previously obtained by system 400.

Fax server instructions 426 could include calls to image processing instructions 428 to perform acts like those shown in FIGS. 7 and 8 if the request indicates an analysis operation. Execution of fax server instructions 426 could further provide data defining an output image, which could be provided to modem 412 for facsimile transmission or to printer 416 for printing.

The implementations described above are especially well suited to offline sketch analysis as in FIG. 11 because speed of analysis matters less for offline analysis than it would for online analysis. Also, reliability may matter more for offline analysis than it would for online analysis. As illustrated in FIG. 12, however, the implementations described above may also be applied in online analysis, such as in a copier.

In FIG. 12, copier 460 can be a digital copier or other electronic reprographics system. Scanning circuitry 462 obtains data defining input image 464 showing a row/column representation. User interface circuitry 470 includes touch sensing device 472, which can be a push button, a heat or pressure sensitive element, a capacitance sensing element, or other device for sensing a touching action. When a user touches device 472, user interface circuitry 470 provides touch data indicating that device 472 has been touched.

Processing circuitry 480 uses the touch data to obtain request data indicating a request for an analysis operation. Then, responding to the request, processing circuitry 480 uses data defining input image 464 to automatically obtain row/column data indicating rows and columns in the row/column representation. Processing circuitry 480 then uses the row/column data to obtain content data indicating an item for each of a set of row/column combinations. Processing circuitry 480 then uses the content data to obtain data defining an output image that shows a table or other representation of the item for each row/column combination in the set. This data is provided to printing circuitry 490 for printing of output image 492.

The invention could also be applied in combination with other techniques, including those described in copending, coassigned U.S. patent application Nos. 08/158,132, entitled "Analyzing an Image Showing a Graphical Representation of a Layout" and No. 08/158,063, entitled "Using a Category to Analyze an Image Showing a Graphical Representation," all incorporated herein by reference.

E. Miscellaneous

The invention has been described in relation to implementations that analyze images showing sketches. The invention might also be implemented to analyze other types of images, by using appropriate criteria to obtain data indicating row data and column data and to obtain data indicating information represented for a row/column combination.

The invention has been described in relation to applications in which content data are used to obtain data defining an output image. The invention might also be implemented to store content data or to use content data for other purposes, such as to provide control signals.

The invention has been described in relation to software implementations, but the invention might be implemented with specialized hardware.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method comprising:
   obtaining input image data defining an input image that shows a row/column representation with rows and columns;
   using the input image data to obtain row data and column data; the row data uniquely indicating parts of the input image within an mth row of the row/column representation; the column data uniquely indicating parts of the input image within an nth column of the row/column representation; the row/column representation representing information for a combination of the mth row and the nth column; and using the row data and the column data to obtain content data indicating information represented by the row/column representation for the combination of the mth row and the nth column.

2. The method of claim 1 in which the row/column representation is a table, a matrix, an array, a calendar, a connection diagram, a puzzle, or a game diagram.

3. The method of claim i in which the act of using the input image data to obtain row data and column data comprises:

using the input image data to obtain horizontal data and vertical data; the horizontal data indicating horizontal lines in the input image; the vertical data indicating vertical lines in the input image; and using the horizontal data to obtain the row data and using the vertical data to obtain the column data.

4. The method of claim 3 in which the row data indicate parts of the input image between horizontal lines and the column data indicate parts of the input image between vertical lines.

5. The method of claim 3 in which the input image includes pixels; the act of using the horizontal data to obtain the row data and using the vertical data to obtain the column data comprising:

using the horizontal data to obtain a row data image indicating a value for each pixel in the input image; the row data image indicating, for each pixel in a part of the input image that is between horizontal lines, a value that uniquely identifies a row between horizontal lines; and using the vertical data to obtain a column data image indicating a value for each pixel in the input image; the column data image indicating, for each pixel in a part of the input image that is between vertical lines, a value that uniquely identifies a column between vertical lines.

6. The method of claim 1 in which the input image shows a sketch of a row/column representation.

7. The method of claim 6 further comprising:

using the contents data to obtain output image data defining an output image that includes a row/column representation similar to the sketch.

8. A method comprising:

obtaining input image data defining an input image that shows a row/column representation with rows and columns;

using the input image data to obtain row data and column data; the row data including, for each row of the row/column representation, a row data item indicating parts of the input image within the row; the column data including, for each column of the row/column representation, a column data item indicating parts of the input image within the column; the row/column representation representing information for each combination of a row and a column; and using the row data and the column data to obtain, for each combination of a row and a column, content data indicating information represented by the row/column representation for the combination of the row and the column.

9. The method of claim 8 in which the content data include a list of sublists, each sublist including a list of combination identifiers, each combination identifier identifying a combination of one of the columns of the row/column representation with a row of the row/column representation, the combination identifiers together identifying combinations of all of the columns of the row/column representation with the row.

10. The method of claim 9 in which each combination identifier indicates a bounding box within which information for the identified combination of a column with a row is represented.

11. A method of operating a machine that includes:

image input circuitry for obtaining data defining images as input; and a processor connected for receiving data defining images from the image input circuitry;

the method comprising:

operating the processor to receive input image data from the image input circuitry, the input image data defining an input image that shows a row/column representation;

operating the processor to use the input image data to obtain row data and column data; the row data indicating parts of the input image within a row of the row/column representation; the column data indicating parts of the input image within a column of the row/column representation; the row-column representation representing information for a combination of the row and the column; and operating the processor to use the row data and the column data to obtain content data indicating information represented by the row/column representation for the combination of the row and the column.

12. The method of claim 11 in which the machine further comprises image output circuitry for providing data defining images as output; the input image showing a sketch of a row/column representation; the method further comprising:

using the content data to obtain output image data defining an output image that includes a row/column representation similar to the sketch; and providing the output image data to the image output circuitry.

13. A machine comprising:

image input circuitry for obtaining data defining images as input;

memory for storing data; and a processor connected for receiving data defining images from the image input circuitry and connected for accessing data stored in the memory;

the data stored in the memory comprising instruction data indicating image processing instructions the processor can execute; the processor, in executing the image processing instructions:

receiving input image data from the image input circuitry, the input image data defining an input image that shows a row/column representation;

using the input image data to obtain row data and column data; the row data indicating parts of the input image within a row of the row/column representation; the column data indicating parts of the input image within a column of the row/column representation; the row-column representation representing information for a combination of the row and the column; and using the row data and the column data to obtain content data indicating information represented by the row/column representation for the combination of the row and the column.

14. The machine of claim 13 in which the input image circuitry is connected for receiving facsimile transmissions.

15. The machine of claim 13, further comprising image output circuitry for providing data defining images as output; the processor further, in executing the image processing instructions:
- using the content data to obtain output image data defining an output image that includes a row/column representation similar to the row/column representation shown by the input image; and
- providing the output image data to the image output circuitry.

16. The machine of claim 15 in which the output image circuitry is connected for providing facsimile transmissions.

17. The machine of claim 13 in which the machine is an image processing server; the image processing server being connected to a network for receiving requests for image processing operations; the network including the image input circuitry; the instruction data further indicating request handling instructions the processor can execute; the processor, in executing the request handling instructions, determining whether to execute the image processing instructions.

18. The machine of claim 13 in which the machine is a fax server.

19. The machine of claim 13 in which the machine is a copier.

20. An article of manufacture for use in a machine that includes:
- image input circuitry for obtaining data defining images as input;
- a storage medium access device for accessing a medium that stores data; and
- a processor connected for receiving data defining images from the image input circuitry; the processor further being connected for receiving data from the storage medium access device;

the article comprising:
- a storage medium that can be accessed by the storage medium access device when the article is used in the system; and
- data stored by the storage medium so that the storage medium access device can provide the stored data to the processor when the article is used in the system; the stored data comprising instruction data indicating instructions the processor can execute; the processor, in executing the instructions:
  - receiving input image data from the image input circuitry, the input image data defining an input image that shows a row/column representation;
  - using the input image data to obtain row data and column data; the row data indicating parts of the input image within a row of the row/column representation; the column data indicating parts of the input image within a column of the row/column representation; the row-column representation representing information for a combination of the row and the column; and
  - using the row data and the column data to obtain content data indicating information represented by the row/column representation for the combination of the row and the column.

* * * * *